April 22, 1924.

A. J. DETLAFF

CLUTCH

Filed Aug. 31, 1921    2 Sheets-Sheet 1

1,491,201

Inventor
Anthony J. Detlaff,
By
Attorneys

April 22, 1924.

A. J. DETLAFF 1,491,201

CLUTCH

Filed Aug. 31. 1921

Patented Apr. 22, 1924.

1,491,201

UNITED STATES PATENT OFFICE.

ANTHONY J. DETLAFF, OF DETROIT, MICHIGAN.

CLUTCH.

Application filed August 31, 1921. Serial No. 497,103.

*To all whom it may concern:*

Be it known that I, ANTHONY J. DETLAFF, a citizen of the United States of America, residing at Detroit, in the county of Wayne and State of Michigan, have invented certain new and useful Improvements in Clutches, of which the following is a specification, reference being had therein to the accompanying drawings.

This invention relates to a multiple disk friction clutch and has special reference to that type of clutch used in the transmission of power from the power plant of an automobile or similar vehicle to the rear axle assembly or driven parts of the automobile.

The primary object of my invention is to provide a clutch which has an outer drum integral with the fly wheel or transmission wheel, thus obviating the necessity of making a fly wheel and drum of separate parts connected together.

Another object of my invention is to provide a multiple disk friction clutch wherein a series of disks are normally maintained in frictional engagement with another series of disks and the first series of disks is arranged to be shifted relative to the second series of disks by axial movement inwardly from the rear end of the clutch, that is, the movement being in the direction of the drive element of the clutch instead of in the direction of the driven element thereof.

A further object of my invention is to provide a clutch, wherein friction disks are maintained in frictional engagement by springs, with spring abutments that may be interchanged to permit of a greater or lesser number of friction disks being used in connection with the clutch, and the spring abutments may also be employed to compensate for any inequalities in the tension of the springs forming part of the clutch.

A still further object of this invention is to provide a multiple disk clutch with primary and secondary disks, the primary disks being housed within a drum integral with a fly wheel, and the secondary disks being sandwiched between the primary disks and slidable on the inner drum. The inner drum is constructed so that the teeth or means which establishes rotative continuity between the inner drum and the secondary disks serve as an end abutment for all of the disks when in frictional driving relation.

A still further object of my invention is to provide a multiple disk clutch wherein the parts are constructed with a view of reducing the cost of manufacture and at the same time retain those features by which durability, accessibility and ease of assembling are secured. With such ends in view my invention resides in the construction to be hereinafter described and then claimed.

Reference will now be had to the drawings, wherein—

Figure 1:
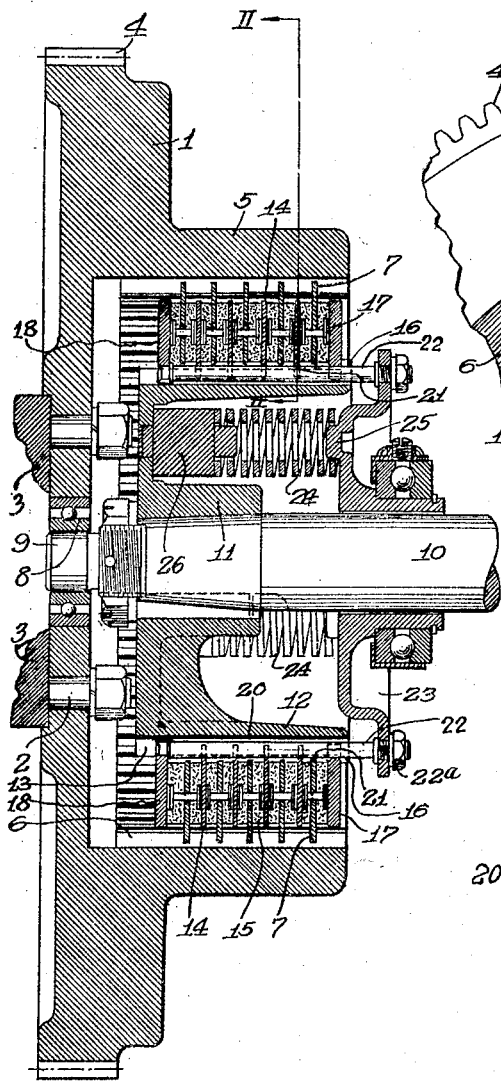
Figure 1 is a vertical longitudinal sectional view of a clutch in accordance with my invention.
Figure 2:
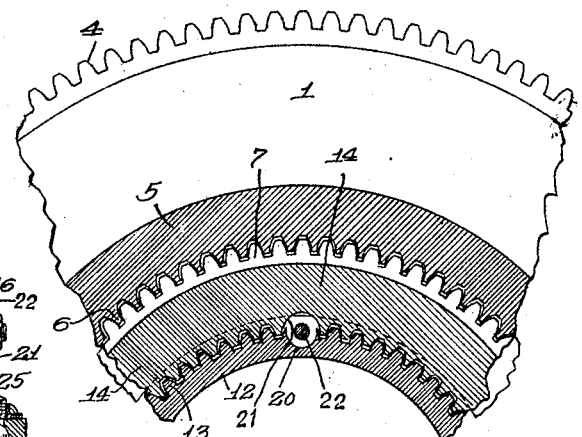
Fig. 2 is a cross sectional view taken on the line II—II of Fig. 1.
Figure 3:
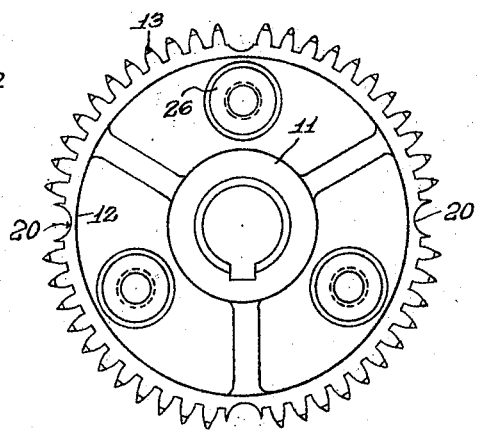
Fig. 3 is a view of the outer end of the inner drum of the clutch.
Figure 5:
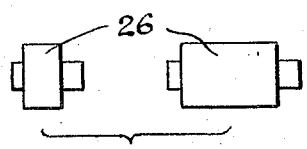
Fig. 5 shows views in elevation of interchangeable abutment members of different lengths.

In describing my invention by aid of the views above referred to, I desire to point out that the same are intended as merely illustrative of the clutch which has been put into practice, and I do not care to confine my invention to the precise construction and arrangement of parts shown, other than defined by the appended claims.

In the drawings, the reference numeral 1 denotes a fly wheel which is ordinarily connected, as at 2 to the end portion 3 of an engine driven crank shaft (not shown). The fly wheel 1 may have its periphery provided with teeth or a gear 4 so that said fly wheel may be temporarily driven by a conventional form of starting mechanism.

The rear face of the fly wheel 1 is provided with an outer drum 5 and the inner wall of said drum is formed with longitudinal gear-like teeth 6, keys, ribs or the like constituting means for establishing rotative continuity between the outer drum and a plurality of parallel peripherally notched friction disks 7 slidable in the outer drum. said disks being somewhat in the form of rings spaced apart, and hereinafter referred to as primary disks.

Figure 4:
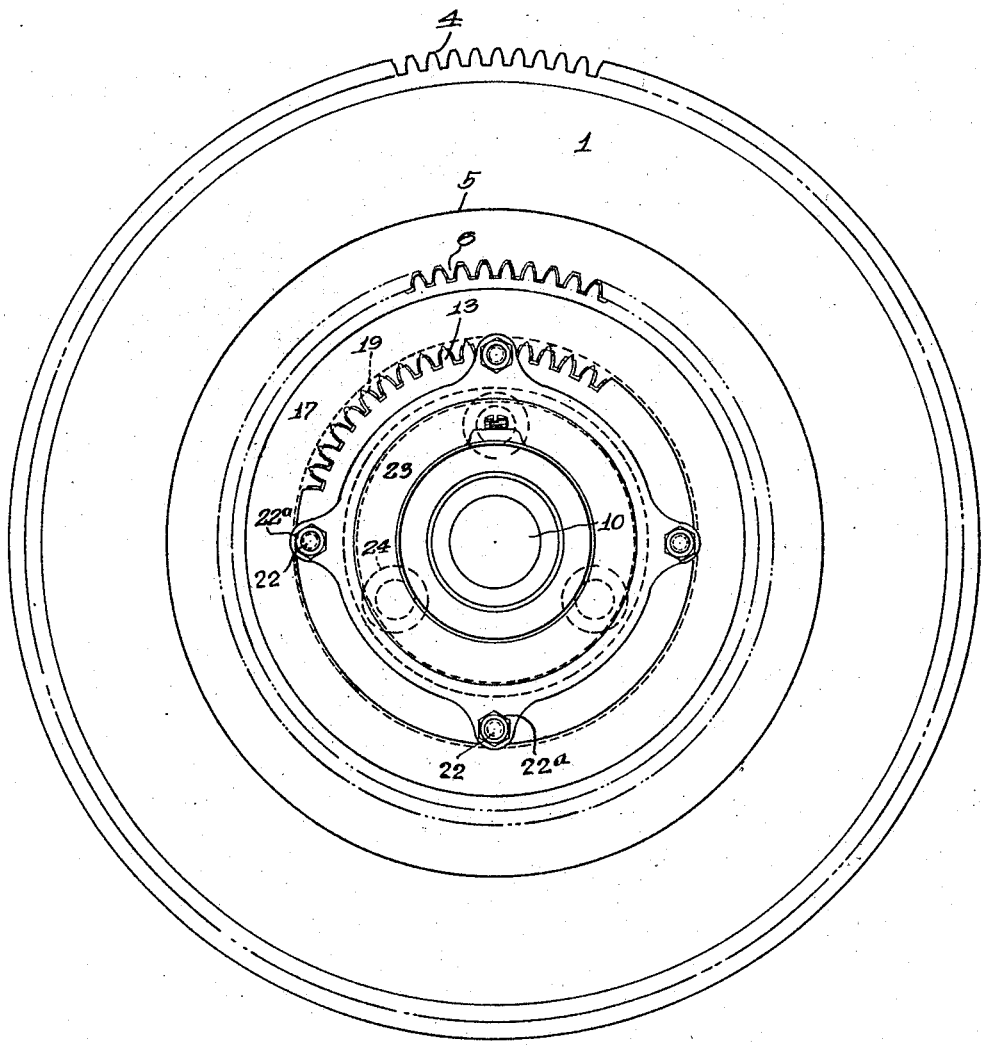
Fig. 4 is an end view of the entire clutch.

Centrally of the fly wheel 1 is an antifrictional bearing 8 supporting the reduced end 9 of a driven shaft 10 which is arranged axially of the fly wheel 1 and the outer drum 5. Keyed or otherwise mounted on the forward end of the driven shaft 10, so as to rotate therewith, is the hub 11 of an inner drum 12, said inner drum having the greater part of its periphery provided with longitudinal gear-like teeth 13, keys, ribs or the like, constituting means for establishing rotative continuity between the inner drum 12 and a plurality of secondary parallel friction disks or rings 14 which have the inner edges thereof notched to receive the teeth 13 and adapted to slide on said teeth. The secondary disks are sandwiched between the primary disks and between all of the disks are compressible friction members 15, made of leather, canvas or any suitable material. The friction disks and the friction members may all be loosely assembled between the outer and inner drums and between a stationary end plate 17 and a movable end plate 18. The stationary end plate 17 is in the form of a ring or annulus on the rear end of the inner drum 12, and it is held by tooth abutments 16. In the formation of the teeth 13, said teeth are ground or flattened, as at 19, to a point adjacent the rear end of the inner drum, and the remaining material on the rear ends of the teeth 13 will serve as abutments for the stationary end plate 17. This is best shown in Fig. 4, where the flattened teeth 13 afford substantial bearing surfaces for the slidable secondary disks, and at the same time provide an end abutment for the stationary end plate 17.

The periphery of the drum 12 has a series of grooves 20 and the inner edges of the secondary disks 14 have a series of notches 21 registering with the grooves 20, said notches and grooves providing clearance for rods 22 having the forward ends thereof fixed to inwardly projecting lugs or portions of the movable end plate 18, such lugs or portions projecting into the grooves 20.

The outer ends of the rods 22 extend through notches in the inner edge of the stationary end plate 17 and are connected, as at 22ª to an adjustable head or member 23 slidable on the driven shaft 10. Any suitable means may be employed for shifting the adjustable member 23 towards the inner drum 12, so as to release the friction disks 7 and 14 and the members 15 relative to one another and permit of the fly wheel 1 and its outer drum 5 revolving independently of the inner drum 12 and the driven shaft 10.

Holding the friction disks and friction members normally in driving relation are a plurality of springs 24 within the drum 12. The rear convolutions of the springs 24 are centered about bosses 25 of the adjustable member 23 and the forward convolutions of the springs are centered on interchangeable spring abutments or compensating members 26 attached to the forward end of the inner drum. As pointed out in the beginning these spring abutments may be of various lengths to permit of the number of friction disks being increased or decreased, also to compensate for any tension inequalities of springs within the inner drum.

To disconnect the driven shaft 10 relative to its driving means it is only necessary to shift the adjustable member 23 inwardly or forwardly towards the fly wheel and through the medium of the connecting rods 22 the movable end plate 18 will be shifted and thus release the friction disks or members relative to each other. As showing a conventional arrangement of the friction members 15 relative to the disks, said friction members have been secured by rivets or other fastening means to the primary disks and said friction members contact with both faces of the primary disks and with the inner faces of the end plates 17 and 18.

From the foregoing it will be observed that the inner drum 12, the springs 24, the end plates 17 and 18, the secondary disks 14, connecting rods 22, and the adjustable member 23 rotate with the driven shaft 10, and any suitable provision may be made for connecting operating mechanism to the adjustable member 23.

What I claim is:—

1. In a multiple disk friction clutch wherein a plurality of disks are adapted to establish a driving relation between a drive shaft and a driven shaft, inner and outer drums between which said disks are mounted, springs in the inner drum maintaining the disks normally in frictional contact, and interchangeable abutment members for said springs.

2. A multiple disk clutch comprising inner and outer drums, friction disks between said drums, a stationary end plate on the rear end of the inner drum, a movable end plate on the forward end of the inner drum, an adjustable member, and springs and interchangeable abutments in said inner drum cooperating with said adjustable member and said movable end plate in maintaining said friction disks in driving relation, said adjustable member being movable toward said inner drum to release the driving relation of said disks.

3. A clutch as in claim 2, characterized by said inner drum being longitudinally grooved, and rods in said drum grooves between said inner drum and said disks connecting said adjustable member to said movable end plate.

4. A multiple disk friction clutch wherein disks are adapted to establish a driving relation between a drive shaft and a driven shaft, and wherein the disks are normally in driving relation:—springs maintaining the driving relation of said disks, and interchangeable abutments for said springs permitting of the number of disks being either increased or decreased.

5. In a multiple disk friction clutch wherein primary and secondary disks are arranged between end plates, and wherein said secondary disks and end plates are supported on a drum:—closely assembled longitudinally disposed teeth establishing a driving relation between said drum and the secondary disks, said teeth being cut away for the greater part of the length thereof to provide an end abutment for one of said end plates so that the other end plate may be shifted to control the action of said disks.

6. A clutch as called for in claim 5, wherein some of the teeth on said drum are cut away, and rods in the cut away portions of said drum teeth adapted for shifting one of said end plates.

7. A clutch comprising inner and outer drums, said drums having gear-like teeth, primary and secondary disks between said drums, said disks having gear-like teeth meshing with the teeth of said drums to establish a driving relation between drive and driven shafts to which said drums are connected, a stationary end plate on said inner drum, a movable end plate on said inner drum, rods on said inner drum connected to said movable end plate and extending through said stationary end plate, an adjustable member connected to said rods, springs in said inner drum bearing against said adjustable member maintaining said disks in driving relation, and abutments between said springs and said inner drum, said abutments being exchangeable for the purpose of either increasing or decreasing the tension of said springs, said means, said adjustable member, rods, end plates and secondary disks being rotatable with the driven shaft.

In testimony whereof I affix my signature in presence of two witnesses.

ANTHONY J. DETLAFF.

Witnesses:
 LEWIS E. FLANDERS,
 ANNA M. DORR.